(12) United States Patent
Nishimura et al.

(10) Patent No.: US 6,300,404 B2
(45) Date of Patent: *Oct. 9, 2001

(54) CURABLE POLYMER COMPOSITION

(75) Inventors: Keiko Nishimura; Masaaki Azuma; Kazumasa Hashimoto, all of Akashi; Fumio Kawakubo, Kobe, all of (JP)

(73) Assignee: Kanegafuchi Chemical Industry Co. Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,449

(22) PCT Filed: Aug. 8, 1996

(86) PCT No.: PCT/JP96/02249

§ 371 Date: Dec. 23, 1998

§ 102(e) Date: Dec. 23, 1998

(87) PCT Pub. No.: WO97/06212

PCT Pub. Date: Feb. 20, 1997

(30) Foreign Application Priority Data

Aug. 10, 1995 (JP) .................................... 7-204466
Aug. 10, 1995 (JP) .................................... 7-204467

(51) Int. Cl.$^7$ ................ C08J 5/10; C08K 5/01; C08L 83/06
(52) U.S. Cl. ............. 524/490; 524/487; 524/488; 524/489; 524/491
(58) Field of Search ..................... 524/487–491

(56) References Cited

U.S. PATENT DOCUMENTS

| 3,632,557 | 1/1972 | Brode et al. ............. 260/77.5 |
| 3,846,359 | * 11/1974 | Rostaing ............... 260/22 S |
| 3,929,704 | * 12/1975 | Horning ............. 260/29.1 SB |
| 4,345,053 | 8/1982 | Rizk et al. ............. 525/440 |
| 4,366,307 | 12/1982 | Singh et al. ............. 528/373 |
| 4,960,844 | 10/1990 | Singh ............. 528/17 |
| 5,684,094 | * 11/1997 | Suzuki et al. ............. 525/403 |

FOREIGN PATENT DOCUMENTS

| 0228596A1 | 7/1987 | (EP) . |
| 0541074A2 | 5/1993 | (EP) . |
| 2050162A | 1/1981 | (GB) . |
| 45-36319 | 11/1970 | (JP) . |
| 46-12154 | 3/1971 | (JP) . |
| 54-6096 | 2/1979 | (JP) . |
| 790168776 | 12/1979 | (JP) . |
| 55-013767 | 1/1980 | (JP) . |
| 55-13768 | 1/1980 | (JP) . |
| 55-21453 | 2/1980 | (JP) . |
| 55-36241 | 3/1980 | (JP) . |
| 57-164123 | 10/1982 | (JP) . |
| 59-78223 | 5/1984 | (JP) . |
| 59-122541 | 7/1984 | (JP) . |
| 59-168014 | 9/1984 | (JP) . |
| 60-228516 | 11/1985 | (JP) . |
| 60-228517 | 11/1985 | (JP) . |
| 61-197631 | 9/1986 | (JP) . |
| 61-215622 | 9/1986 | (JP) . |
| 61-215623 | 9/1986 | (JP) . |
| 61-218632 | 9/1986 | (JP) . |
| 63-112642 | 5/1988 | (JP) . |
| 1-149851 | 6/1989 | (JP) . |
| 1-188557 | 7/1989 | (JP) . |
| 6-172631 | 6/1994 | (JP) . |
| 07286162 | 10/1995 | (JP) . |

* cited by examiner

Primary Examiner—James J. Seidleck
Assistant Examiner—U. K. Rajguru
(74) Attorney, Agent, or Firm—Foley & Lardner

(57) ABSTRACT

A curable polymer composition comprising (a) an oxyalkylene polymer having a silicon-containing group which has a hydroxyl or hydrolyzable group bonded to the silicon atom and can be crosslinked through a silanol condensation reaction, and (b) a paraffinic hydrocarbon, which composition provides a cured material having improved tack which remains on the surface of the cured material.

8 Claims, No Drawings

CURABLE POLYMER COMPOSITION

FIELD OF THE INVENTION

The present invention relates to a curable polymer composition which is curable in the presence of moisture and has improved surface tack (stickiness).

PRIOR ART

Polymers having a silicon-containing group, which has a hydroxyl or hydrolyzable group bonded to the silicon atom and can be crosslinked through a silanol condensation reaction (hereinafter referred to as "reactive silicon-containing group"), are crosslinked and cured in the presence of moisture. Curable compositions comprising polymers having backbones of oxyalkylene polymers such as polyoxypropylene and the reactive silicon-containing group among the above polymers are widely used, for example, as sealants for construction, since they are in the liquid state at room temperature, and are cured to provide rubbery elastic materials. However, tack (stickiness) remains on the surfaces of the cured materials of such compositions according to the compositions of the curable compositions or curing conditions, and dirts or dusts adhere to the surfaces, which deteriorate the appearance of the cured materials.

To overcome such defects, for example, JP-A-55-21453 discloses the addition of organic silicone polymers to the polymers having the reactive silicon-containing group. The addition of the organic silicone polymer deteriorate mechanical properties such as modulus, strength at break, elongation, and the like, although the tack is improved.

JP-A-55-36241 discloses the addition of photocurable materials, JP-A-1-149851 discloses the addition of liquid diene polymers, and JP-A-1-188557 discloses the addition of silicone compounds having long chain hydrocarbon groups, to the polymers having the reactive silicon-containing group. However, the addition of such materials increases the cost of the curable compositions, and also has drawbacks that the tack is insufficient in a relatively early stage of curing, and satisfactory effects are not obtained with some compositions or under some curing conditions.

SUMMARY OF THE INVENTION

One object of the present invention is to provide a curable composition comprising a polymer having a reactive silicon-containing group, which is less expansive and can decrease the tack of a cured product without deteriorating modulus and elongation at break of the cured material.

Accordingly, the present invention provides a curable polymer composition comprising (a) an oxyalkylene polymer having a silicon-containing group which has a hydroxyl or hydrolyzable group bonded to the silicon atom and can be crosslinked through a silanol condensation reaction, and (b) a paraffinic hydrocarbon.

The curable polymer composition of the present invention may additionally contain.

(c) a silicone compound having a long chain hydrocarbon group, which is preferably a silicone compound having a $C_{8-20}$ alkyl group.

DETAILED DESCRIPTION OF THE INVENTION

The backbone of the oxyalkylene polymer having the reactive silicon-containing group (a) which is contained in the composition of the present invention comprises a repeating unit of the formula (1):

$$-R^1-O- \tag{1}$$

wherein $R^1$ is a divalent organic group, preferably a straight or branched alkylene group having 1 to 14 carbon atoms.

Examples of the repeating unit of the formula (1) are $-CH_2O-$, $-CH_2CH_2O-$, $-CH_2CH(CH_3)O-$, $-CH_2CH(C_2H_5)O-$, $-CH_2C(CH_3)_2O-$, $-CH_2CH_2CH_2CH_2O-$, and the like.

The backbone of the oxyalkylene polymer may consist of the single kind of the repeating unit, while it may comprise two or more kinds of repeating units in which the $R^1$ groups are different. In particular, polymers comprising propylene oxide, particularly polyoxypropylene are preferable, when the compositions are used as sealants, and the like.

The reactive silicon-containing group included in the polymer (a) of the composition according to the present invention is preferably a group of the formula (2):

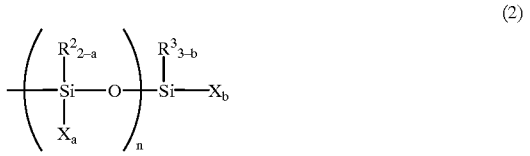

$$(2)$$

wherein $R^2$ and $R^3$ are the same or different and represent a $C_{1-20}$ alkyl group, a $C_{6-20}$ aryl group, a $C_{7-20}$ aralkyl group or a triorganosiloxy group of the formula: $(R^4)_3SiO-$ in which three $R^4$ groups are the same or different and represent a $C_{1-20}$ alkyl group, provide that when two or more $R^2$ or $R^3$ groups are present, they may be the same or different; the X groups are the same or different and represent a hydroxyl group or a hydrolyzable group; a is 0, 1 or 2; and b is 0, 1, 2 or 3, provided that the sum of a and b is not 0; and n is an integer of 0 to 19, with the proviso that the suffixes "a" in the repeating units:

$$(3)$$

may be the same or different.

The hydrolyzable group X in the formula (2) may not be limited, and may be any conventional hydrolyzable group. Examples of such a group are a hydrogen atom, a halogen atom, an alkoxy group, an acyloxy group, a ketoxymate group, an amino group, an amido group, an acid amide group, an aminoxy group, a mercapto group, an alkenyloxy group, and the like. Among them, a hydrogen atom, alkoxy, acyloxy, ketoximate, amino, amido, aminoxy, mercapto and alkenyloxy groups are preferable. In particular, the alkoxy group is preferable in view of its mild hydrolyzability and easy handling.

One, two or three hydrolyzable groups and/or hydroxyl groups can be attached to one silicon atom, and the total number of the hydrolyzable groups and/or hydroxyl groups, that is, (na+b) is preferably between 1 and 5. When two or more hydrolyzable or hydroxyl groups are present in the reactive silicon-containing group, they may be the same or different.

The reactive silicon-containing group contains at least one silicon atom. When the silicon atoms are bonded through siloxane bonds or the like, the number of silicon atoms is preferably about 20.

Among the reactive silicon-containing groups, a reactive silicon-containing group of the formula (4):

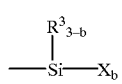

(4)

wherein $R^3$, X and b are the same as defined above, because of easy availability.

Specific examples of the $R^2$ and $R^3$ groups are alkyl groups (e.g. a methyl group, an ethyl group, etc.), cycloalkyl groups (e.g. a cyclohexyl group, etc.), aryl groups (e.g. a phenyl group, etc.), aralkyl groups (e.g. a benzyl group, etc.), triorganosiloxy groups of the formula $(R^4)_3SiO$— in which $R^4$ is a methyl group or a phenyl group. In particular, a methyl group is preferable as the $R^2$ and $R^3$ groups.

The particularly preferable reactive silicon-containing group is —$Si(CH_3)$—$(OCH_3)_2$.

The reactive silicon-containing group may be introduced in the polymers by any known methods. The following methods are exemplified:

(i) An oxyalkylene polymer having a functional group such as a hydroxyl group in a molecule is reacted with an organic compound having an unsaturated group and an active group which is reactive with the functional group in the oxyalkylene polymer, to obtain the oxy-alkylene polymer having unsaturated groups. Alternatively, an epoxy compound having an unsaturated group and an alkylene oxide are copolymerized to obtain an oxyalkylene polymer having an unsaturated groups. Then, the reaction product is reacted with a hydrosilane having a reactive silicon-containing group for the hydrosilylation of the reaction product.

(ii) The oxyalkylene polymer having the unsaturated groups, which has been obtained in the same manner as in the method (i), is reacted with a compound having a mercapto group and a reactive silicon-containing group.

(iii) An oxyalkylene polymer having a functional group such as a hydroxyl group, an epoxy group, an isocyanate group, etc. is reacted with a compound having a reactive silicon-containing group and a functional group reactive with the above functional group.

Among these methods, the method (i) and the method (iii) in which a polymer having a hydroxyl group at a chain end and a compound having an isocyanate group and a reactive silicon-containing group are reacted, are preferable.

The oxyalkylene polymer as the component (a) used according to the present invention may be a linear or branched one, and its molecular weight is preferably between about 500 and about 50,000, preferably between 1000 and 20,000.

The number of the reactive silicon-containing groups contained in the oxyalkylene polymer is at least one, preferably between 1.1 and 5, on the average, per one molecule of the polymer. When the number of the reactive silicon-containing groups in the molecule is less than one, the polymer has insufficient curing properties. When the number is too large, the network becomes overly dense, and thus the cured material does not have good mechanical properties.

Specific examples of the oxyalkylene polymers as the component (a) according to the present invention are those disclosed in JP-B-45-36319, JP-B-46-12154, JP-A-50-156599, JP-A-54-6096, JP-A-55-13767, JP-A-55-13768, JP-A-57-164123, JP-B-3-2450, U.S. Pat. Nos. 3,632,557, 4,345,053, 4,366,307 and 4,960,844, and oxyalkylene polymers having a large number average molecular weight of at least 6000 and a narrow molecular weight distribution Mw/Mn of 1.6 or less which are disclosed in JP-A-61-197631, JP-A-61-215622, JP-A-61-215623 and JP-A-61-218632. The disclosures of the above US patents are hereby incorporated by reference.

The oxyalkylene polymers having the reactive silicon-containing group may be used independently, or as a mixture of two or more of them. Blends of the oxyalkylene polymers with vinyl polymers having a reactive silicon-containing group may be used.

Methods for the production of the blends of the oxyalkylene polymers and vinyl polymers having the reactive silicon-containing group are disclosed in JP-A-59-122541, JP-A-63-112642, JP-A-6-172631, and the like.

Preferable examples of the vinyl polymer having the reactive silicon-containing group are copolymers of acrylate and/or methacrylate ester monomeric units molecular chain of which is represented by the following formula (5) and which has a reactive silicon-containing group and an alkyl group having 1 to 8 carbon atoms, and acrylate and/or methacrylate ester monomeric units molecular chain of which is represented by the following formula (6) and which has an alkyl group having at least 10 carbon atoms:

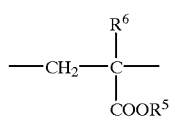

(5)

wherein $R^5$ is an alkyl group having 1 to 8 carbon atoms, and $R^6$ is a hydrogen atom or a methyl group;

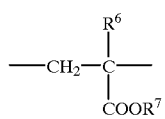

(6)

wherein $R^6$ is the same as defined above, and $R^7$ is an alkyl group having at least 10 carbon atoms.

Examples of $R^5$ in the formula (5) are alkyl groups having 1 to 8 carbon atoms, preferably 1 to 4 carbon atoms, more preferably 1 or 2 carbon atoms, such as a methyl group, an ethyl group, a propyl group, a n-butyl group, a tert.-butyl group, 2-ethylhexyl group, etc. The kind of the alkyl group $R^5$ may be a single kind alkyl group, or a combination of two or more alkyl groups.

Examples of $R^7$ in the formula (6) are long chain alkyl groups having at least 10 carbon atoms, usually 10 to 30 carbon atoms, preferably 10 to 20 carbon atoms, such as a lauryl group, a tridecyl group, a cetyl group, a stearyl group, etc. The kind of the alkyl group $R^7$ may be a single kind alkyl group, or a combination of two or more alkyl groups.

The backbone of the above vinyl copolymer comprises substantially the repeating units of the formulas (5) and (6). Herein, the term "substantially" means that the total weight of the repeating units of the formulas (5) and (6) exceeds 50 wt. %. Preferably, the total weight of the repeating units of the formulas (5) and (6) is at least 70 wt. %.

A weight ratio of the repeating units of the formula (5) to those of the formula (6) is preferably between 95:5 and 40:60, more preferably between 90:10 and 60:40.

The copolymer may comprise other repeating units in addition to the repeating units of the formulas (5) and (6). Examples of monomers which provide the other repeating units are acrylic acids (e.g. acrylic acid, methacrylic acid, etc.), monomers having an amide group (e.g. acrylamide, methacrylamide, N-methylolacrylamide, N-methylolmethacrylamide, etc.), monomers having an epoxy group (e.g. glycidyl acrylate, glycidyl methacrylate, etc.), monomers having an amino group (e.g. diethylaminoethyl acrylate, diethylaminoethyl methacrylate, aminoethyl vinyl ether, etc.), acrylonitrile, styrene, α-methylstyrene, alkyl vinyl ethers, vinyl chloride, vinyl acetate, vinyl propionate, ethylene, and the like.

The number average molecular weight of the copolymer is preferably between 500 and 100,000 in view of the easy handing.

The reactive silicon-containing group contained in the copolymer may be the same as that contained in the oxyalkylene polymer.

For the preparation of the blend of the oxyalkylene polymer and the vinyl polymer having the reactive silicon-containing group, the (meth)acrylate ester monomers may be polymerized in the presence of the oxyalkylene polymer having the reactive silicon-containing group. This method is disclosed in JP-A-59-78223, JP-A-59-168014, JP-A-60-228516, JP-A-60-228517, and the like. The preparation method is not limited to the above method.

The curable composition of the present invention may contain other polymers having a reactive silicon-containing group, for example, polydimethylsiloxane and the like, in addition to the oxyalkylene polymer (a) having at least one reactive silicon-containing group in a molecule.

The paraffinic hydrocarbon (b) may be any known paraffinic hydrocarbon. The paraffinic hydrocarbon may be a straight or branched one. The significant effects can be achieved, when the paraffinic hydrocarbon having at least 6 carbon atoms, preferably 8 to 18 carbon atoms is used. Hydrocarbons having too small or too large number of carbon atoms may not achieve the effects of the present invention sufficiently under the employed temperature conditions, since those having too small number of carbon atoms evaporate at high temperature, while those having too large number of carbon atoms solidify at low temperature.

The specific gravity of the paraffinic hydrocarbon used according to the present invention is 0.85 or less, preferably 0.83 or less, in particular 0.80 or less.

The paraffinic hydrocarbon used according to the present invention does not include one having a hetero atom such as chlorinated paraffin.

Specific examples of the paraffinic hydrocarbon are n-octane, 2-ethylheptane, 3-methylheptane, n-nonane, 2-methyloctane, 3-methyloctane, n-decane, 2-methylnonane, 3-methylnonane, n-undecane, n-dodecane, n-tridecane, n-tetradecane, 4,5-dipropyloctane, 3-methyltridecane, 6-methyltridecane, n-hexadecane, n-heptadecane, n-octadecane, and the like. They may be used independently or as a mixture of two or more of them.

The amount of the paraffinic hydrocarbon (b) is preferably between 0.1 and 150 wt. parts, more preferably between 1 and 60 wt. parts per 100 wt. parts of the oxyalkylene polymer (a). When the amount of the paraffinic hydrocarbon is less than 0.1 wt. parts, the effects of the addition of the paraffinic hydrocarbon are not sufficiently achieved. When the amount of the paraffinic hydrdocarbon exceeds 150 wt. parts, the mechanical strength of the cured material deteriorate.

The composition of the present invention may contain hydrocarbons other than the paraffinic hydrocarbons. Examples of such hydrocarbons are olefinic, diolefinic, polyolefinic and acetylenic hydrocarbons. Furthermore, reaction products obtained by hydrogenating polymers of unsaturated hydrocarbons may be used.

The composition of the present invention may optionally contain (c) a silicone compound having a long chain hydrocarbon group. The addition of the silicone compound having the long chain hydrocarbon group can further improve the tack on the surface of the cured material.

The long chain hydrocarbon group in the silicon compound (c) includes long chain alkyl groups, long chain alkenyl groups, cycloalkyl groups having a long chain alkyl or alkenyl group, which have a silicon-containing group bonded to one chain end, and long chain alkylene groups having silicon-containing groups bonded to both chain ends. The hydrocarbon group contains at least 8 carbon atoms, preferably 8 to 20 carbon atoms in the hydrocarbon part contained in the straight chain (excluding a cyclic hydrocarbon group).

Specific examples of the long chain alkyl group are a n-octyl group, a decyl group, an undecyl group, a dodecyl group, a tridecyl group, a tetradecyl group, a cetyl group, a stearyl group, an eicosyl group, and the like. Specific examples of the long chain alkenyl group are an octenyl group, a nonenyl group, a decenyl group, a dodecenyl group, a tetradecenyl group, a hexadecenyl group, an octadecenyl group, an eicosenyl group, an octadecadienyl group, a 9,12,15-octadecatrienyl group, a 9,11,13-octadecatrienyl group, and the like. Specific examples of the long chain alkylene group are $-(CH_2)_{11}-$, $-(CH_2)_{13}-$, $-(CH_2)_{15}-$, $-(CH_2)_{19}-$, $-(CH_2)_{20}-$, and the like.

The silicon-containing compound having the long chain hydrocarbon group has also a reactive silicon-containing group. This reactive silicon-containing group may be the same as that contained in the oxyalkylene polymer. A reactive silicon-containing group having one silicon atom is preferable in view of the cost.

Specific examples of the silicon-containing compound having the long chain hydrocarbon group are $CH_3(CH_2)_9Si(OCH_3)_3$, $CH_3(CH_2)_{17}Si(OCH_3)_3$, $CH_3(CH_2)_{11}Si(OC_2H_5)_3$, $CH_3(CH_2)_{17}Si(OC_2H_5)_3$, $CH_3(CH_2)_9Si(CH_3)(OCH_3)_2$, $CH_3(CH_2)_{17}Si(CH_3)(OCH_3)_2$, $(CH_3O)_3Si(CH_2)_{10}Si(OCH_3)_3$, $(CH_3O)_2(CH_3)Si(CH_2)_{10}Si(CH_3)(OCH_3)_2$, and the like.

The amount of the silicon-containing compound having the long chain hydrocarbon group is preferably between 0.1 and 30 wt. parts, more preferably between 0.5 and 20 wt. parts per 100 wt. parts of the oxyalkylene polymer. When the amount of this silicon-containing compound is less than 0.1 wt. parts, the effects of the addition of this compound may not be achieved. When this amount exceeds 30 wt. parts, the cost increases, and the tensile properties of the cured material may deteriorate.

The composition of the present invention may optionally contain a plasticizer. In such a case, the amount of the plasticizer should be adjusted in accordance with the amount of the paraffinic hydrocarbon (b) contained in the composition. The amount of the plasticizer is selected so that the total amount of the paraffinic hydrocarbon and plasticizer is in the range between 0.1 and 150 wt. parts, preferably around 100 wt. parts, per 100 wt. parts of the oxyalkylene polymer, in which range the preferable effects are achieved. When the amount of the plasticizer exceeds 150 wt. parts, the mechanical strength of the cured material decreases, and the effect for improving the tack is not achieved.

Specific examples of the plasticizer are phthalates (e.g. dioctyl phthalate, diisodecyl phthalate, dibutyl phthalate, butylbenzyl phthalate, etc.), epoxy plasticizers (e.g. epoxidized soybean oil, epoxidized linseed oil, benzyl epoxystearate, etc.), polyester plasticizers (e.g. polyesters of dibasic acids and dihydric alcohols, etc.), polyethers (e.g. polypropylene glycol and its derivatives, etc.), styrenic polymers (e.g. poly-α-methylstyrene, polystyrene, etc.), polybutadiene, butadiene-acrylonitrile copolymers, polychloroprene, polyisobutylene, polybutene, chlorinated paraffins, and the like. They may be used independently or as a mixture of two or more of them.

The curable composition of the present invention may contain a silanol condensation catalyst for accelerating the reaction of the reactive silicon-containing group. Preferable examples of the silanol condensation catalyst are titanates (e.g. tetrabutyl titanate, tetrapropyl titanate, etc.); organic tin compounds (e.g. dibutyltin dilaurate, dibutyltin maleate, dibutyltin diacetate, tin octylate, tin naphthenate, reaction products of dibutyltin oxide and phthalates, dibutyltin diacetylacetonate, etc.); organic aluminum compounds (e.g. aluminum trisacetylacetonate, aluminum trisethylacetoacetate, diisopropoxyaluminum ethylacetoacetate, etc.); reaction products of bismuth salts and carboxylic acids (e.g. bismuth-tris(2-ethyl-hexanoate), bismuth-tris(neodecanoate), etc.); chelating agents (e.g. zirconium tetraacetylacetonate, titanium tetraacetylacetonate, etc.), organic lead compounds (e.g. lead octylate, etc.); organic vanadium compounds; amine compounds (e.g. butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5.4.0]-7-undecene (DBU), etc.) and salts of these amine compounds with carboxylic acid and the like; low molecular weight polyamide resins obtained from excessive polyamines and polybasic acids; reaction products of excessive polyamines and epoxy compounds; and the like. Furthermore, conventionally used other condensation catalysts may be used.

The silanol condensation catalysts may be used independently or as a mixture of two or more of them.

Among the above silanol condensation catalysts, organic metal compounds, or combinations of organic metal compounds and amine compounds are preferable in view of the curing properties.

The amount of the silanol condensation catalyst is preferably between 0.01 and 20 wt. parts, more preferably between 0.1 and 10 wt. parts per 100 wt. parts of the oxyalkylene polymer having the reaction silicon-containing group.

When the amount of the silanol condensation catalyst is too small in relation to the oxyalkylene polymer, the curing rate becomes too low so that the curing reaction may not proceed sufficiently. When the amount of the silanol condensation catalyst is too large in relation to the oxyalkylene polymer, the composition is partly heated or foamed during curing and thus good cured materials may not be obtained.

If desired, the curable composition of the present invention may contain various additives such as dehydrating agents, compatibilizers, adhesion-improvers, physical property-modifiers, storage stability improvers, fillers, anti-aging agents, UV ray absorbers, metal-deactivating agents, antiozonants, light-stabilizers, amine base radical chain transfer inhibitors, phosphorus base peroxide-decomposers, lubricants, pigments, foaming agents, flame retardants, antistatic agents, and the like.

When the fillers are used as the additives, the following fillers can be used:

wood meal, walnut shell flour, rice hull powder, pulp, cotton chips, mica, graphite, diatomaceous earth, china clay, kaolin, clay, talk, fumed silica, precipitated silica, silica, quartz, glass beads, calcium carbonate, magnesium carbonate, titanium oxide, aluminum powder, zinc powder, asbestos, glass fiber, carbon fiber, and the like. These fillers may be used independently or as a mixture of two or more of them.

The method for the preparation of the curable polymer composition of the present invention is not limited, and any conventional method may be used. For example, the components (a) and (b) and optional components are compounded, and dissolved and mixed with a mixer, rolls or a kneader.

The curable polymer composition of the present invention may be prepared in the form of a two pack type curable composition, and also a one pack type curable composition. In the latter case, the composition is prepared substantially in the absence of moisture, and can be stored stably for a long time, when it is stored in a sealed state. When the composition is exposed to an air after the storage, the curing of the composition starts from its surface.

The composition of the present invention is useful as an elastic sealing material in the fields of building, construction and industries. It can be used as a coating, an adhesive, a caulking material, a coating material, and the like.

EXAMPLES

The curable composition of the present invention will be explained more in detail by the following examples, which do not limit the present invention in any way.

Examples 1–12 and Comparative Examples 1–2

Surface treated glued calcium carbonate (average particle size of 0.08 μm) (120 wt. parts), titanium oxide (20 wt. parts), hydrogenated castor oil (2 wt. parts), dibutyltin diacetylacetonate (1 wt. part), and further a hydrocarbon shown in Table 1, DIDP (diisodecyl phthalate) or NEW POLE LB 285 (oxypropylene glycol monoether manufactured by SANYO CHEMICAL Co., Ltd.) in amounts shown in Table 1 were added to 100 wt. parts of a propylene oxide polymer having an average molecular weight of 8000 and two methyldimethoxysilyl groups [—Si(CH$_3$)(OCH$_3$)$_2$] per one molecule on the average. Then, the mixture was thoroughly kneaded in an atmosphere containing substantially no moisture. Thus, a curable resin composition was obtained.

In Table 1, octane, undecane and tridecane are supplied from WAKO JUNYAKU Co., Ltd., N-12 is normal paraffin (n-dodecane 99.0%) available from NIKKO PETROCHEMICALS, YH-NP is normal paraffins (n-dodecane: 18%, n-tridecane: 59%, n-tetradecane: 19%, and n-heptadecane: 4%) available from NIKKO PETROCHEMICALS, and SH-NP is normal paraffin (n-tetradecane: 5%, n-heptadecane: 37%, and n-hexadecane: 8%) available from NIKKO PETROCHEMICALS.

The obtained composition was spread in a thickness of 3 mm and cured at 23° C., 55% RH. Then, the residual tack on the surface of the cured material was evaluated by finger touching after 1 day and 7 days. The results are shown in Table 1.

TABLE 1

| | Example No. | | | | | | | | | | | | Comp. Ex. No. | |
|---|---|---|---|---|---|---|---|---|---|---|---|---|---|---|
| | 1 | 2 | 3 | 4 | 5 | 6 | 7 | 8 | 9 | 10 | 11 | 12 | 1 | 2 |
| Hydrocarbon | | | | | | | | | | | | | | |
| Octane | 10 | — | — | — | — | — | — | — | — | — | — | — | — | — |
| Undecane | — | 10 | — | — | — | — | 20 | — | 45 | — | — | — | — | — |
| Tridecane | — | — | 10 | — | — | — | — | 20 | — | — | — | — | — | — |
| N-12 | — | — | — | 10 | — | — | — | — | — | 10 | — | — | — | — |
| YH-NP | — | — | — | — | 10 | — | — | — | — | — | 10 | — | — | — |
| SH-NP | — | — | — | — | — | 10 | — | — | — | — | — | 10 | — | — |
| Plasticizer | | | | | | | | | | | | | | |
| DIDP | 45 | 45 | 45 | 45 | 45 | 45 | 35 | 35 | 10 | — | — | — | 55 | — |
| LB-285 | — | — | — | — | — | — | — | — | — | 45 | 45 | 45 | — | 55 |
| Tack after | | | | | | | | | | | | | | |
| 1 day | C | C | C–B | C | C | C | C | C | C–B | C | C | C | D–C | D–C |
| 7 days | B | B | B–A | B | B | C–B | B | B | A | B | B | B | C | C |

Note: Tack on the surface:
A: No tack remains.
B: Slight tack remains.
C: Tack remains
D: Heavy tack remains.

From the results in Table 1, it is understood that the addition of the paraffinic hydrocarbons to the oxyalkylene polymer can provide the cured materials having improved tack which remains on the surface.

Examples 13–20 and Comparative Examples 3–4

Surface treated glued calcium carbonate (average particle size of 0.08 μm) (120 wt. parts), titanium oxide (20 wt. parts), hydrogenated castor oil (2 wt. parts), dibutyltin diacetylacetonate (1 wt. part), and further a hydrocarbon shown in Table 2, KBM 3103C $(CH_3(CH_2)_9Si(OCH_3)_3$ manufactured by SHINETSU SILICONE Co., Ltd.) or TSL 8185 $(CH_3(CH_2)_{17}Si(OCH_3)_3$ manufactured by TOSHIBA SILICONE Co., Ltd.) and DIDP (diisodecyl phthalate) in amounts shown in Table 2 were added to 100 wt. parts of a propylene oxide polymer having an average molecular weight of 8000 and two methyldimethoxysilyl groups per one molecule on the average. Then, the mixture was thoroughly kneaded in an atmosphere containing substantially no moisture. Thus, a curable resin composition was obtained.

In Table 2, undecane is supplied from WAKO JUNYAKU Co., Ltd., and YH-NP and SH-NP are the same as those in Table 1.

The obtained composition was spread in a thickness of 3 mm and cured at 23° C., 55% RH. Then, the residual tack on the surface of the cured material was evaluated by finger touching after 1 day and 7 days. The results are shown in Table 2.

TABLE 2

| | Example No. | | | | | | | | Comp. Ex. No. | |
|---|---|---|---|---|---|---|---|---|---|---|
| | 13 | 14 | 15 | 16 | 17 | 18 | 19 | 20 | 3 | 4 |
| Hydrocarbon | | | | | | | | | | |
| Undecane | 5 | 5 | — | — | — | — | 10 | 20 | — | — |
| YH-NP | — | — | 5 | 5 | — | — | — | — | — | — |
| SH-NP | — | — | — | — | 5 | 5 | — | — | — | — |
| Silane compound | | | | | | | | | | |
| KBM 3103C | 5 | — | 5 | — | 5 | — | 5 | 5 | 5 | — |
| TSL 8185 | — | 5 | — | 5 | — | 5 | — | — | — | 5 |
| Plasticizer | | | | | | | | | | |
| DIDP | 50 | 50 | 50 | 50 | 50 | 50 | 45 | 35 | 55 | 55 |
| Tack after | | | | | | | | | | |
| 1 day | B | B | B | B | B | B | B–A | A | C | C |
| 7 days | B–A | B–A | B–A | B–A | B–A | B–A | A | A | B | C–B |

Note: Tack on the surface:
A: No tack remains.
B: Slight tack remains.
C: Tack remains
D: Heavy tack remains.

From the results in table 2, it is understood that the addition of the paraffinic hydrocarbons and silicon compounds having the long chain hydrocarbon group to the oxyalkylene polymer can provide the cured materials having improved tack which remains on the surface after one day from the start of curing.

What is claimed is:

1. A curable polymer composition comprising
    (a) an oxyalkylene polymer having a silicon-containing group which has a hydroxyl or hydrolyzable group bonded to the silicon atom and can be crosslinked through a silanol condensation reaction, and
    (b) 0.1 to 150 wt. parts of a paraffinic hydrocarbon, per 100 wt. parts of the oxyalkylene polymer (a).

2. A curable polymer composition according to claim 1, wherein said oxyalkylene polymer is polyoxyproplene.

3. A curable polymer composition according to claim 1, wherein said silicon-containing group is a group of the formula

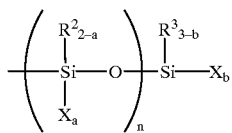

wherein $R^2$ and $R^3$ are the same or different and represent a $C_{1-20}$ alkyl group, a $C_{6-20}$ aryl group, a $C_{7-20}$ aralkyl group or a triorganosiloxy group of the formula: $(R^4)_3SiO-$ in which three $R^4$ groups are the same or different and represent a $C_{1-20}$ alkyl group, provide that when two or more $R^2$ or $R^3$ groups are present, they may be the same or different; the X groups are the same or different and represent a hydroxyl group or a hydrolyzable group; a is 0, 1 or 2; and b is 0, 1, 2 or 3, provided that the sum of a and b is not 0; and n is an integer of 0 to 19, with the proviso that the suffixes "a" in the repeating units in the brackets may be the same or different.

4. A curable polymer composition according to claim 1, wherein said silicon-containing group is a group of the formula:

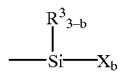

wherein $R^3$, X and b are the same as defined above.

5. A curable polymer composition according to claim 1, wherein said silicon-containing group is $-Si(CH_3)-(OCH_3)_2$.

6. A curable polymer composition according to claim 1, wherein said paraffinic hydrocarbon is a paraffinic hydrocarbon having 8 to 18 carbon atoms.

7. A curable polymer composition according to claim 1, which further comprises (c) a silicone compound having a long chain hydrocarbon group which has 8 to 18 carbon atoms in the hydrocarbon part contained in the straight chain (excluding a cyclic hydrocarbon group).

8. A curable polymer composition according to claim 1, wherein said silicon compound is a silicone compound having a $C_{8-20}$ alkyl group.

* * * * *